(12) United States Patent
Schwalbe et al.

(10) Patent No.: US 10,315,707 B2
(45) Date of Patent: Jun. 11, 2019

(54) ENGINE HOOD MOUNTING SYSTEM

(71) Applicant: CNH Industrial America LLC, New Holland, PA (US)

(72) Inventors: Blaine Schwalbe, Valders, WI (US); Lawrence R. Borucki, Jr., Oostburg, WI (US); Ross Christiansen, Kiel, WI (US); Steven N. Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/661,230

(22) Filed: Jul. 27, 2017

(65) Prior Publication Data

US 2019/0031245 A1    Jan. 31, 2019

(51) Int. Cl.
| | |
|---|---|
| *B62D 25/12* | (2006.01) |
| *E05D 3/02* | (2006.01) |
| *E05D 5/10* | (2006.01) |
| *E05D 5/02* | (2006.01) |
| *E05D 5/06* | (2006.01) |
| *E05D 5/14* | (2006.01) |

(52) U.S. Cl.
CPC ............ *B62D 25/12* (2013.01); *E05D 3/02* (2013.01); *E05D 5/0207* (2013.01); *E05D 5/062* (2013.01); *E05D 5/10* (2013.01); *E05D 5/14* (2013.01); *E05D 2005/102* (2013.01); *E05Y 2600/50* (2013.01); *E05Y 2900/518* (2013.01); *E05Y 2900/536* (2013.01)

(58) Field of Classification Search
CPC ......... B62D 25/12; E05D 3/02; E05D 5/0207; E05D 5/062; E05D 5/10; E05D 5/14; E05D 2005/102; E05Y 2600/50; E05Y 2900/518; E05Y 2900/536
See application file for complete search history.

(56) References Cited

U.S. PATENT DOCUMENTS

| | | | | |
|---|---|---|---|---|
| 3,349,427 | A | * | 10/1967 | Cairns ...................... E05D 3/02 16/273 |
| 4,040,501 | A | | 8/1977 | Haswell |
| 4,221,274 | A | | 9/1980 | Martin |
| 4,738,327 | A | | 4/1988 | Takei |
| 4,811,983 | A | * | 3/1989 | Watts ....................... E02F 9/00 180/89.14 |
| 5,803,198 | A | | 9/1998 | Baxter et al. |
| 5,992,550 | A | | 11/1999 | Groenlund |

(Continued)

*Primary Examiner* — James A Shriver, II
*Assistant Examiner* — Brian L Cassidy
(74) *Attorney, Agent, or Firm* — Rebecca L. Henkel; Rickard K. DeMille

(57) ABSTRACT

An engine hood mounting system includes an engine hood having at least one engine hood pivot support disposed on an inner surface thereof, at least one pivot joint located on a chassis frame of the agricultural machine, and at least one pivot bar assembly configured to interfit with a respective pivot joint and engine hood pivot support. The at least one pivot bar assembly includes an outer pivot bar having a first end and a second end and an inner pivot bar disposed within the outer pivot bar having a first end and a second end. The outer pivot bar and the inner pivot bar are coupled to each other via at least one fastener. Further, the at least one pivot bar assembly, its respective engine hood pivot support, and its respective pivot joint are oriented along a rotation axis.

19 Claims, 7 Drawing Sheets

(56) References Cited

U.S. PATENT DOCUMENTS

| | | | |
|---|---|---|---|
| 6,092,818 A | 7/2000 | Shute | |
| 6,173,475 B1* | 1/2001 | Senn | E05D 5/14 |
| | | | 16/273 |
| 6,357,820 B1 | 3/2002 | Nagatsuka et al. | |
| 6,454,035 B1* | 9/2002 | Waskow | B62D 33/067 |
| | | | 180/69.21 |
| 6,540,283 B1* | 4/2003 | Johansson | B62D 33/067 |
| | | | 180/89.14 |
| 6,910,731 B2* | 6/2005 | Albright | B62D 33/067 |
| | | | 180/89.16 |
| 6,945,832 B2* | 9/2005 | Roycroft | B60F 3/003 |
| | | | 440/12.52 |
| 7,096,987 B2 | 8/2006 | Moen et al. | |
| 7,992,665 B2 | 8/2011 | Giovannini et al. | |
| 8,595,901 B1* | 12/2013 | Shaw | E05D 3/02 |
| | | | 16/235 |
| 8,850,783 B2 | 10/2014 | Goman et al. | |
| 8,887,849 B2* | 11/2014 | Hite | E05D 5/0207 |
| | | | 180/69.2 |
| 8,893,834 B2 | 11/2014 | Berkeland | |
| 9,308,944 B2* | 4/2016 | Hanson | B62D 25/182 |
| 2002/0092694 A1 | 7/2002 | McIlwraith | |
| 2005/0077255 A1* | 4/2005 | Schluter | E05D 5/121 |
| | | | 211/26 |
| 2005/0283948 A1* | 12/2005 | Hyde | E05D 7/1061 |
| | | | 16/361 |
| 2007/0289790 A1* | 12/2007 | Moen | B62D 25/10 |
| | | | 180/69.2 |
| 2008/0295290 A1* | 12/2008 | Murray | E05D 5/062 |
| | | | 16/386 |
| 2009/0230710 A1 | 9/2009 | Cech et al. | |
| 2013/0025954 A1* | 1/2013 | Miller | B62D 25/10 |
| | | | 180/69.21 |
| 2013/0111703 A1* | 5/2013 | Duffy | E05D 7/04 |
| | | | 16/221 |
| 2014/0070569 A1* | 3/2014 | Schmitz | B62D 25/10 |
| | | | 296/193.11 |
| 2015/0096145 A1* | 4/2015 | Nakao | E05D 15/266 |
| | | | 16/76 |
| 2015/0376933 A1* | 12/2015 | Schweiss | E06B 1/12 |
| | | | 49/339 |
| 2018/0119467 A1* | 5/2018 | Liu | E05D 11/0081 |

* cited by examiner

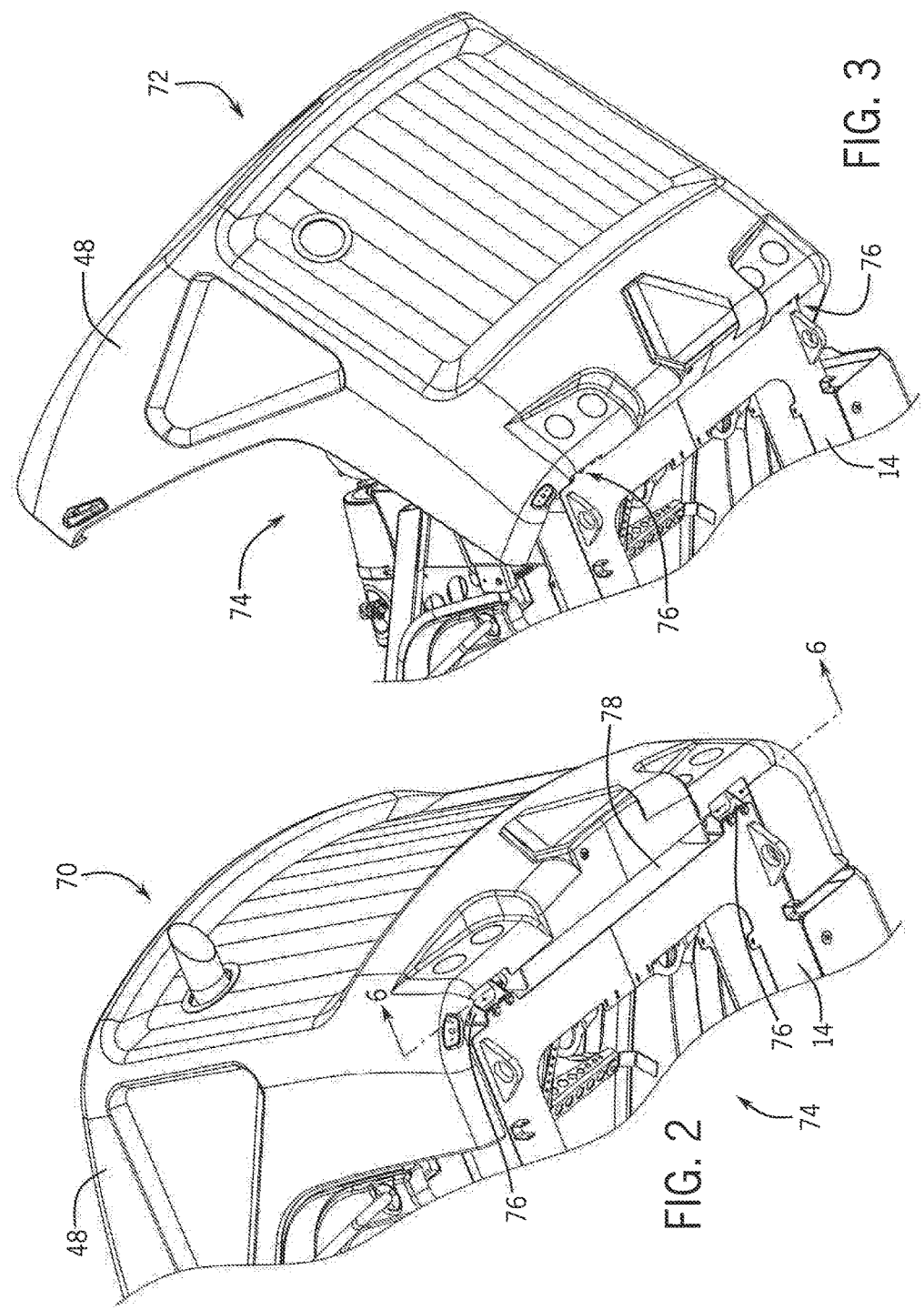

ENGINE HOOD MOUNTING SYSTEM

FIELD OF THE INVENTION

The invention relates generally to agricultural product application equipment or agricultural machines such as self-propelled sprayers and, in particular, to engine hood mounting system configured to allow the engine hood to pivot between a closed position and an open position.

BACKGROUND OF THE INVENTION

High-clearance sprayers are getting larger and more complex to allow for increasing coverage in a single pass, which improves application efficiency. These high-clearance sprayers require high horsepower engines with numerous engine drive accessories and systems such as exhaust after-treatment systems that need to be mounted near the engine. Inspecting and servicing these accessories and systems can present challenges because of limited space inside of engine compartments.

The current design of the engine enclosure has numerous different panels and covers supported by an outer engine frame. The panels and covers can be individually opened to allow access to different areas within the engine compartment. These include a pair of lower engine access covers that are hinged at their outer edges to pivot down and out to provide access to the engine compartment from below. A pair of front engine cowling access doors can be slid side-to-side to provide access to the engine compartment from the front. A rear engine compartment cover is hinged at its top and can be pivoted up to provide access into the back of the engine compartment. An engine compartment roof is hinged at a longitudinally extending outer edge that can be pivoted up to provide access to the side/top of the engine compartment from above. Side covers include a hydraulics cover that is hinged mounted and can pivot open at one side of the engine enclosure, with a panel secured by fasteners to the outer engine frame to cover the rest of that side of the engine compartment. At the other side engine compartment, a panel is bolted through a vertically extending flange at an outer side of the panel to the outer engine frame. Access to any of the panels and/or covers is limited to the space between the open panel(s) and/or cover(s) and the rest of the engine enclosure and components within the engine compartment. When more space is needed, the panel(s) and/or cover(s) have to be disassembled and removed.

Therefore, a need exists for an improved engine hood mounting system that provides for rotatably mounting an engine hood including top and rear walls to the rear of a chassis frame, which allows the engine hood to pivot out-of-the-way in a rearward direction.

SUMMARY OF THE INVENTION

The present invention is directed to engine hood mounting system configured to hinge-mount an engine rear hood to pivot back and away to widely expose sections of the engine compartment for improving access during inspection and serviceability.

According to one aspect of the invention, an engine hood mounting system of an agricultural machine includes an engine hood having at least one engine hood pivot support disposed on an inner surface thereof, at least one pivot joint located on a chassis frame of the agricultural machine, and at least one pivot bar assembly configured to interfit with a respective pivot joint and engine hood pivot support. The at least one pivot bar assembly includes an outer pivot bar having a first end and a second end and an inner pivot bar disposed within the outer pivot bar having a first end and a second end. The outer pivot bar and the inner pivot bar are coupled to each other via at least one fastener. Further, each pivot bar assembly, its respective engine hood pivot support, and its respective pivot joint are oriented along a rotation axis.

According to another aspect of the invention, the engine hood mounting system includes a first pivot joint and a second pivot joint. The first pivot joint is located on a rear surface of the chassis frame adjacent a first side edge of the chassis frame. The second pivot joint is also located on the rear surface of the chassis frame adjacent a second side edge of the chassis frame. Further, the engine hood mounting system includes a first engine hood pivot support and a second engine hood pivot support. The first engine hood pivot support is located at a first location at or near a first bottom corner of the inner surface of the engine hood, and the second engine hood pivot support is located at a location at or near a second bottom corner of the inner surface of the engine hood. A first pivot bar assembly is configured to interfit with the first pivot joint and the first engine hood pivot support, while a second bar assembly is configured to interfit with the second pivot joint and the second engine hood pivot joint.

According to yet another aspect of the invention, a method of manufacturing an engine hood mounting system includes providing an engine hood having at least one pivot support disposed along a lower portion of an inner surface thereof, providing a chassis frame having at least one pivot joint disposed on a rear surface thereof, and inserting at least one pivot bar assembly into a channel of a respective one of the at least one pivot support and into a channel of a respective one of the at least one pivot joint in order to rotatably couple the engine hood and the chassis frame. Further, each of the pivot support, pivot joint, and pivot bar assembly are oriented along a rotation axis.

According to another embodiment of the invention, a method of manufacturing an engine hood mounting system includes providing an engine hood having a first pivot support disposed at a first bottom location of the inner surface of the engine hood and a second pivot support disposed at a second bottom location of the inner surface of the engine hood, providing a chassis frame having a first pivot joint disposed on a rear surface thereof adjacent a first edge of the chassis frame and a second pivot joint disposed on a rear surface thereof adjacent a second edge of the chassis frame, inserting a first pivot bar assembly into a channel of the first pivot support and into a channel of the first pivot joint in order to rotatably couple the engine hood and the chassis frame, and inserting a second pivot bar assembly into a channel of the second pivot support and into a channel of the second pivot joint. As a result of the above, the engine hood is rotatably coupled to the chassis frame. Further, the first and second pivot supports, first and second pivot joints, and first and second pivot bar assemblies are oriented along a rotation axis.

According to yet another aspect of the invention, an engine hood mounting system includes a first pivot support located at a first bottom location of an inner surface of an engine hood, a second pivot support located at a second bottom location of the inner surface of the engine hood, a first pivot joint coupled to a chassis frame adjacent a first edge of a chassis frame, and a second pivot joint coupled to the chassis frame adjacent a second edge of the chassis frame, the first edge being opposite the second edge. The engine hood mounting system further includes a first pivot bar assembly having a first end disposed within the first pivot support and a portion between the first end and a second end disposed within the first pivot joint and a second pivot bar assembly having a first end disposed within the second pivot support and a portion between the first end and a second end disposed within the second pivot joint. Each of the first and second pivot bar assemblies, the first and second pivot joints, and the first and second pivot supports are centered on an axis.

According to another aspect of the invention, the first pivot bar assembly is configured to rotate within the first pivot joint and the second pivot bar assembly is configured to rotate within the second pivot joint. The first and second pivot bar assemblies rotate around the axis.

According to yet another aspect of the invention, the first pivot bar assembly includes a first outer pivot bar, a first inner pivot bar disposed within the first outer pivot bar, and a fastener to couple together the first outer and inner pivot bars. Similarly, the second pivot bar assembly includes a second outer pivot bar, a second inner pivot bar disposed within the second outer pivot bar, and a fastener to couple together the second outer and inner pivot bars.

BRIEF DESCRIPTION OF THE DRAWINGS

Preferred exemplary embodiments of the invention are illustrated in the accompanying drawings in which like reference numerals represent like parts throughout.

FIG. 2 is a lowered isometric view of an engine hood mounting system at a rear end of the agricultural machine of FIG. 1 in a closed position, according to an embodiment of the invention;

FIG. 3 is a lowered isometric view of the engine hood mounting system of FIG. 2 with the engine hood in an open position, according to an embodiment of the invention;

DETAILED DESCRIPTION OF THE PREFERRED EMBODIMENTS

Figure 1:
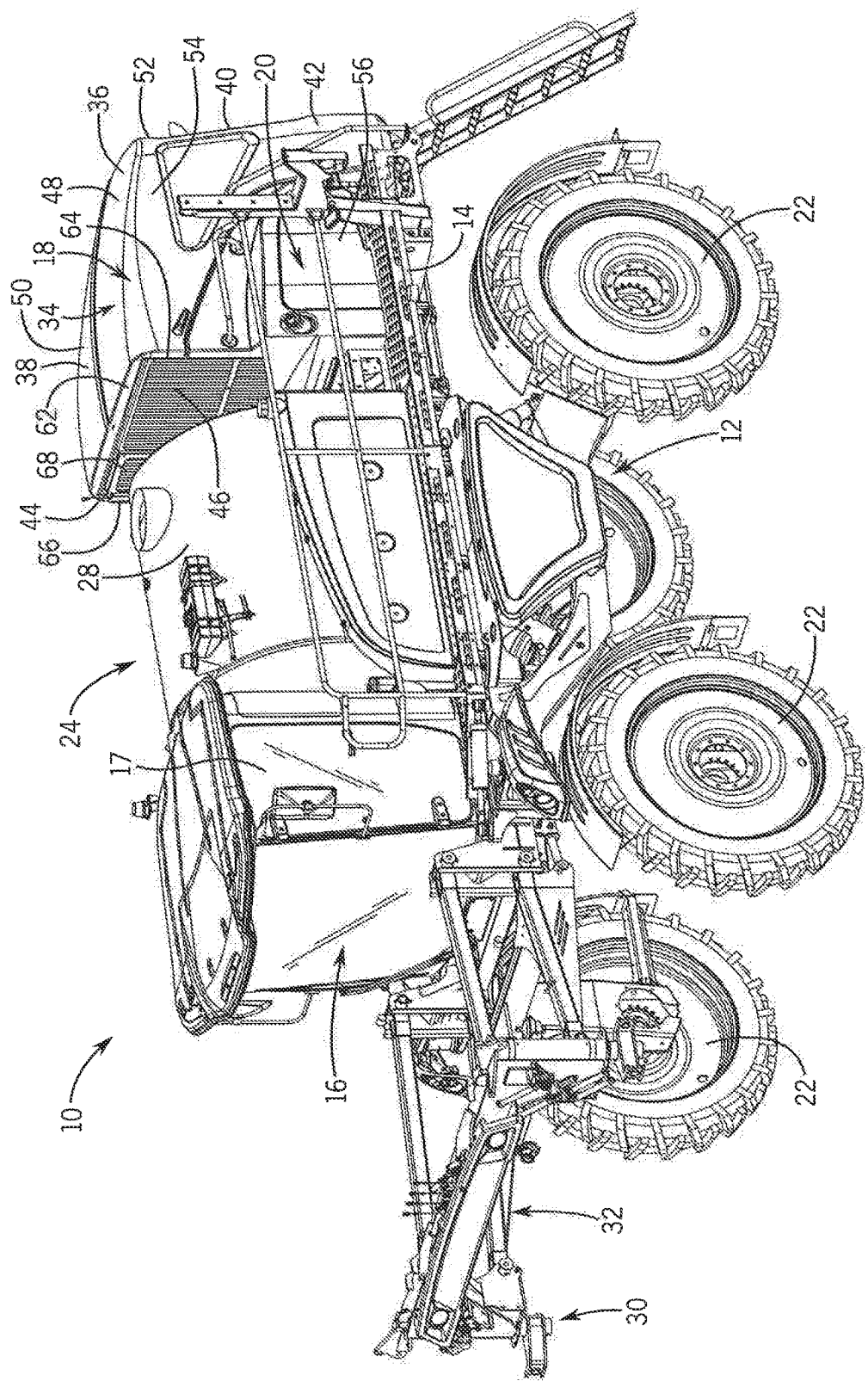
FIG. 1 is an isometric view of an agricultural machine.

Referring now to the drawings and specifically to FIG. 1, aspects of the invention are shown for use with an agricultural machine 10, for example, but not limited to, an agricultural sprayer. The agricultural sprayer is shown here as a self-propelled agricultural sprayer vehicle or self-propelled sprayer. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers, and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, an engine 18, an engine accessory system 34, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a rinse tank 26 for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

Engine 18 and engine accessory system 34 are housed within an engine compartment 36. The engine compartment 36 includes a top wall 38, a rear wall 40, a left side wall 42, a right side wall 44, and a front wall 46 to enclose and protect the engine 18 and engine accessory system 34. As shown in FIG. 2, which shows an enlarged perspective view of the engine compartment 36, the engine compartment 36 includes an engine hood 48. In the representative embodiment of the invention, the top and rear walls 38, 40 of the engine compartment are formed by a top portion 50 and a rear-facing portion 52 of the engine hood 48. In addition, a left side portion 54 of the engine hood 48 and a left side panel 56 together form the left side wall 42 of the engine compartment 36. Similarly, a right side portion 58 of the engine hood 48 and a right side panel 60 together form the right side wall 44 of the engine compartment 36.

Meanwhile, the front wall 46 of the engine compartment 36 is formed by a combination of a forward-facing portion 62 of the engine hood 48, a forward-facing portion 64 of the left side panel 56, a forward-facing portion 66 of the right side panel 58, and an access sliding door system 68.

In the above descriptions and the descriptions that follow, the terms "left" and "right" are used solely for the purpose of convenience to facilitate clarity of the description, and are not meant to otherwise limit the engine hood 48, side panels 56, 58, etc. or how they can be oriented.

FIGS. 2 and 3 depict a lowered isometric view of the engine hood 48 and the chassis frame 14 of the agricultural machine 10. In FIG. 2, the engine hood 48 is in a closed position 70. Meanwhile, FIG. 3 depicts the engine hood 48 in an open position 72. As shown in FIG. 2, an engine hood mounting system 74 includes the engine hood 48 and at least one pivot joint 76 is mounted to a rear surface 78 of the chassis frame 14. While the representative embodiment of the invention illustrates the use of two (2) pivot joints 76, other embodiments of the invention may include more or less than two (2) pivot joints. Further, each pivot joint 76 may be either coupled to the chassis frame 14 or integrally formed with the chassis frame 14. As described in further detail below, the engine hood 48 transitions from a closed position 70 to an open position 72, and vice versa, by rotating along an axis 80 (shown in FIG. 6) aligned with the pivot joints 76.

Figure 4:
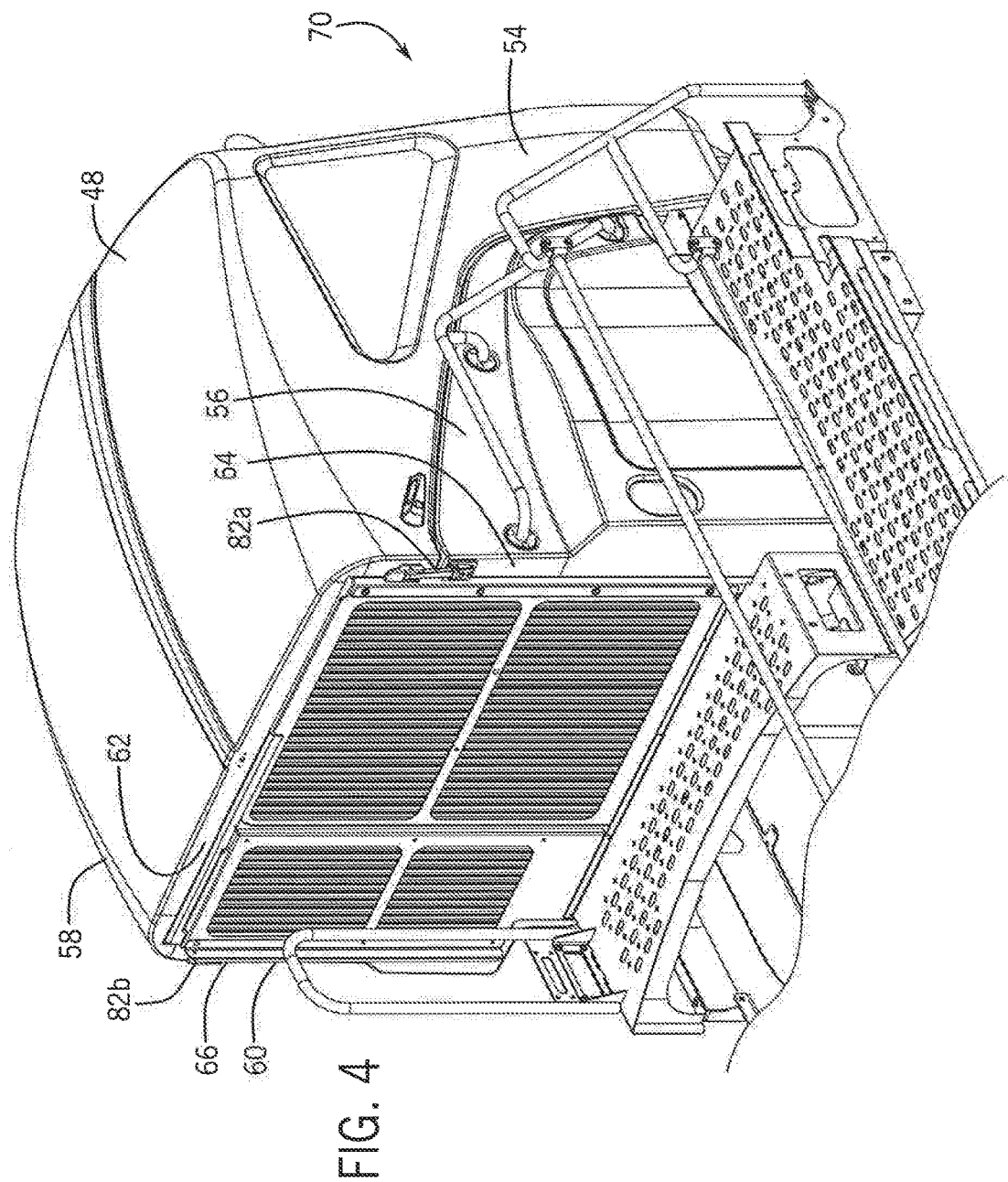
FIG. 4 is a raised isometric view of the engine hood mounting system of FIG. 2 with the engine hood in the closed position, according to an embodiment of the invention.

FIG. 4 shows a raised isometric view of the engine hood mounting system 74 with the engine hood 48 in the closed position 70. At least one latching mechanism 82 may be disposed on the forward-facing portion 62 of the engine hood 48 and the forward-facing portion 64, 66 of the left side panel 56 and/or the right side panel 60, respectively, in order to lock the engine hood 48 in the closed position 70. In the representative embodiment of the invention, a first latching mechanism 82a is coupled to the forward-facing portion 62 of the engine hood 48 in a location adjacent the left side portion 54 of the engine hood 48 and the forward-facing portion 64 of the left side panel 56. In addition, a second latching mechanism 82b is coupled to the forward-facing portion 62 of the engine hood 38 in a location adjacent the right side portion 58 of the engine hood 48 and the forward-facing portion 66 of the right side panel 60.

Other embodiments of the invention may include more or less than two (2) latching mechanisms that may be located at any location on the engine hood 48, including the forward-facing portion 62 of the engine hood 48, the left side portion 54 of the engine hood 48, and/or the right side portion 58 of the engine hood 48, and any location on the left side panel 56 and/or the right side panel 60.

Figure 5:
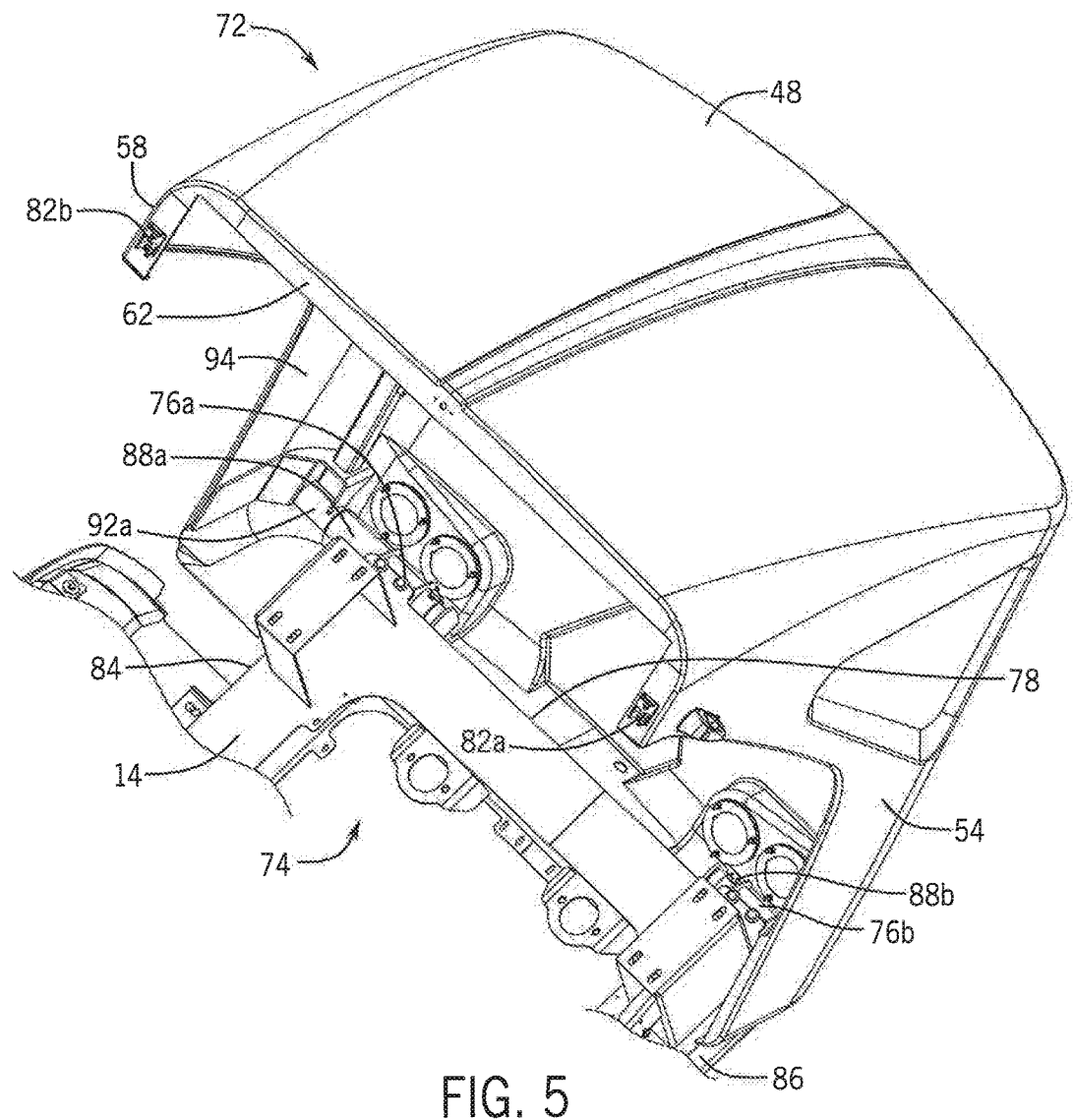
FIG. 5 is a raised isometric view of the engine hood mounting system of FIG. 2 with the engine hood in the open position, according to an embodiment of the invention.

FIG. 5 shows a raised isometric view of the engine hood mounting system 74 with the engine hood 48 in the open position 72. As previously stated, the representative embodiment of the invention includes a first pivot joint 76a and a second pivot joint 76b. The first pivot joint 76a is located adjacent a first side edge 84 of the chassis frame 14, and the second pivot joint 76b is located adjacent a second side edge 86 of the chassis frame 14. However, alternative embodiments of the invention may include more or less than two (2) pivot joints 76. Further the pivot joints 76 may be mounted to the chassis frame 14 at any location along the rear surface 78 of the chassis frame 14.

The engine hood mounting system 74 further includes at least one pivot bar assembly 88. As shown and further described in later figures, each of the at least one pivot bar assemblies 88 is configured to interfit with a channel 90 formed within a respective one of the at least one pivot joints 76. The pivot bar assembly 88 freely rotates within the pivot joint 76 to allow the engine hood 48 to transition from a closed position 70 to an open position 72, and vice versa. In the representative embodiment of the invention, the engine hood mounting system 74 includes a first pivot bar assembly 88a configured to interfit with the first pivot joint 76a and a second pivot bar assembly 88b configured to interfit with the second pivot joint 76b.

The engine hood mounting system 74 may also include at least one pivot support 92 disposed along an inner surface 94 of the engine hood 48. In the representative embodiment of the invention, the at least one pivot support 92 includes a first pivot support 92a disposed along the inner surface 94 of the engine hood 48 adjacent the right side portion 58 of the engine hood and a second pivot support 92b disposed along the inner surface 94 of the engine hood 48 adjacent the left side portion 54 of the engine hood 48. As will be described in further detail below, each pivot support 92 includes a channel 96 located therein, oriented along the rotation axis 80, and configured to interfit with a respective pivot bar assembly 88.

In other embodiments of the invention, the engine hood mounting system may include more or less than two (2) pivot supports 92 disposed along the inner surface 94 of the engine hood 48 adjacent at least one of the left side portion 54, the right side portion 58, and the rear-facing portion 52 of the engine hood 48. Additionally, the at least one pivot support 92 may be coupled to or formed integrally with the engine hood 48.

Figure 6:
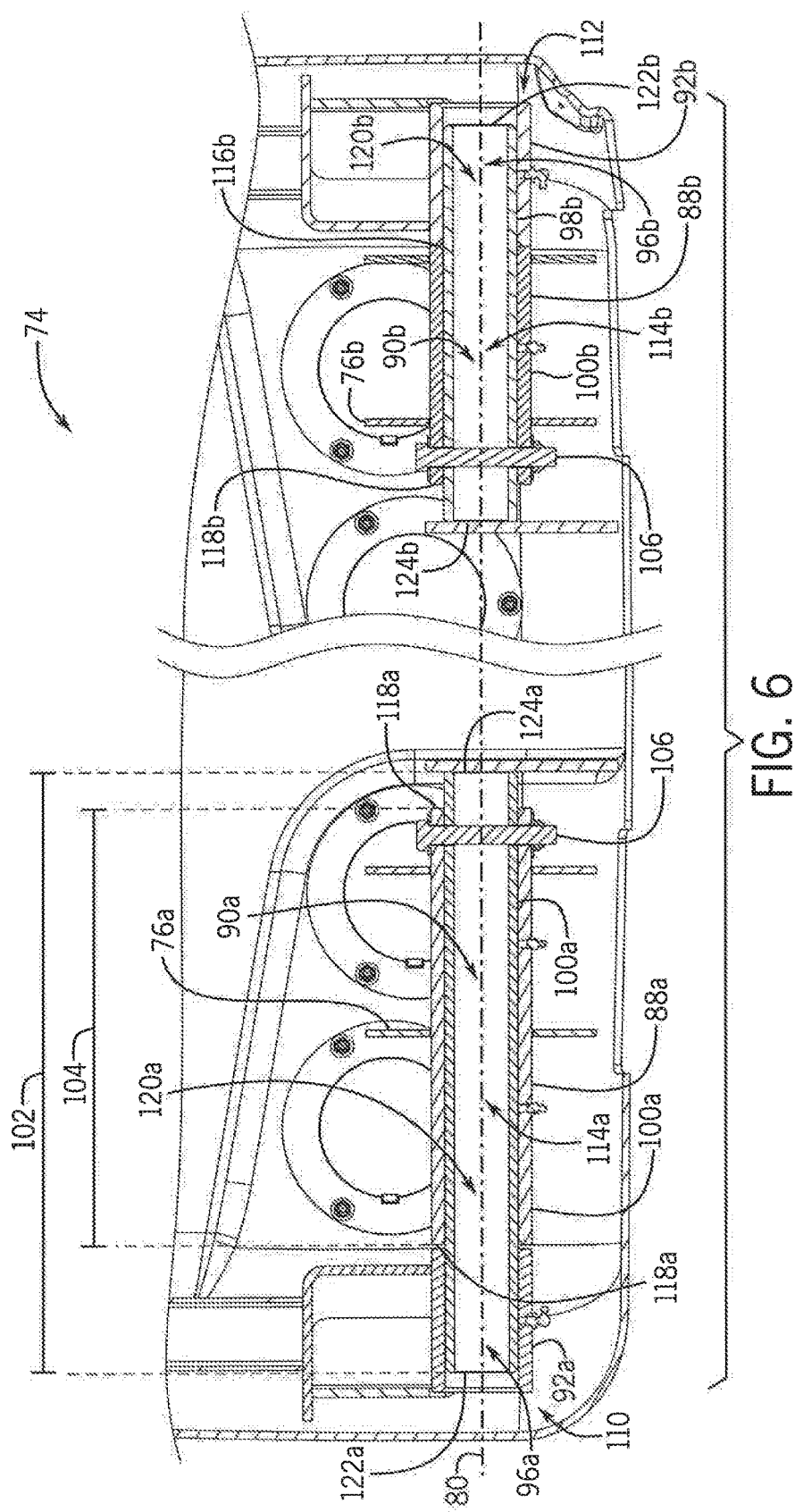
FIG. 6 is a cross-sectional view of the engine hood mounting system of FIG. 2 taken along line 6-6, according to an embodiment of the invention.

Now referring to FIG. 6, a cross-sectional view of the engine hood mounting system 74 take along line 6-6 of FIG. 2 is shown. As shown, each pivot bar assembly 88 includes an inner pivot bar 98 disposed within an outer pivot bar 100. The inner pivot bar 98 has a length 102 greater than a length 104 of the outer pivot bar 100, which allows the inner pivot bar 98 to extend into the channel 96 of the engine hood pivot support 92. It is contemplated that in different embodiments of the invention, the inner pivot bar 98 of the pivot bar assembly 88 may or may not be allowed to freely rotate within the channel 96 of the engine hood pivot support 92. In the representative embodiment of the invention, the inner pivot bar 98 and the outer pivot bar 100 are secured together via at least one fastener 106. In this instance, a number of orifices 108 may be formed through the inner and outer pivot bars 98, 100, which when aligned allow the at least one fastener 106 to pass through and couple together the inner and outer pivot bars 98, 100. However, alternative embodiments of the invention may use other coupling means to couple together the inner and outer pivot bars 98, 100, and, therefore, may not require the inclusion of orifices 108.

While FIG. 6 depicts the first pivot bar assembly 88a having a greater length than the second pivot bar assembly 88b, it is contemplated that in different embodiments of the invention, the length of the first pivot bar assembly 88a may be greater than, equal to, or less than the length of the second pivot bar assembly 88b.

Figure 7:
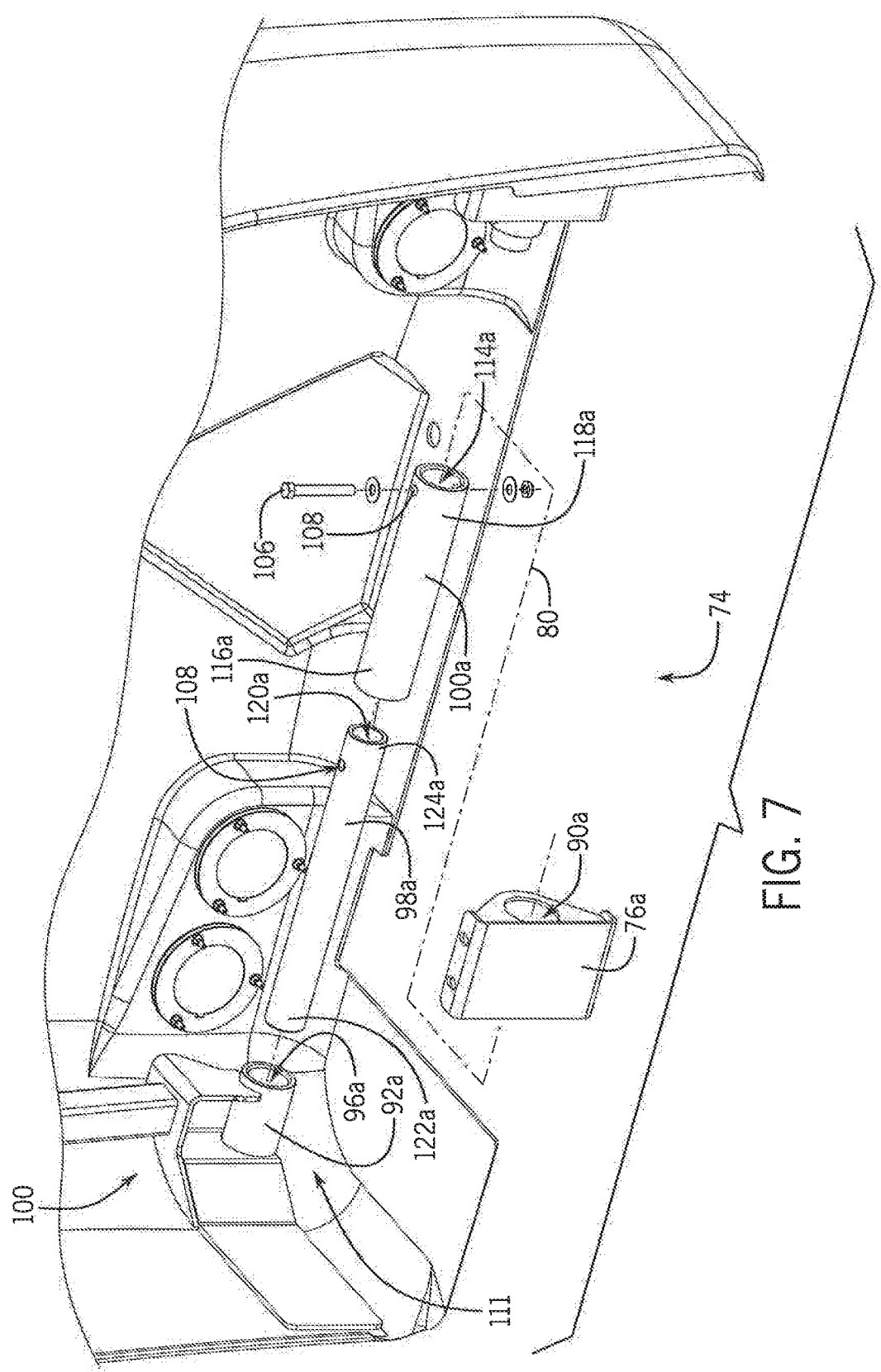
FIG. 7 is an exploded isometric view of a first portion of the engine hood mounting system of FIG. 6, according to an embodiment of the invention.
Figure 8:
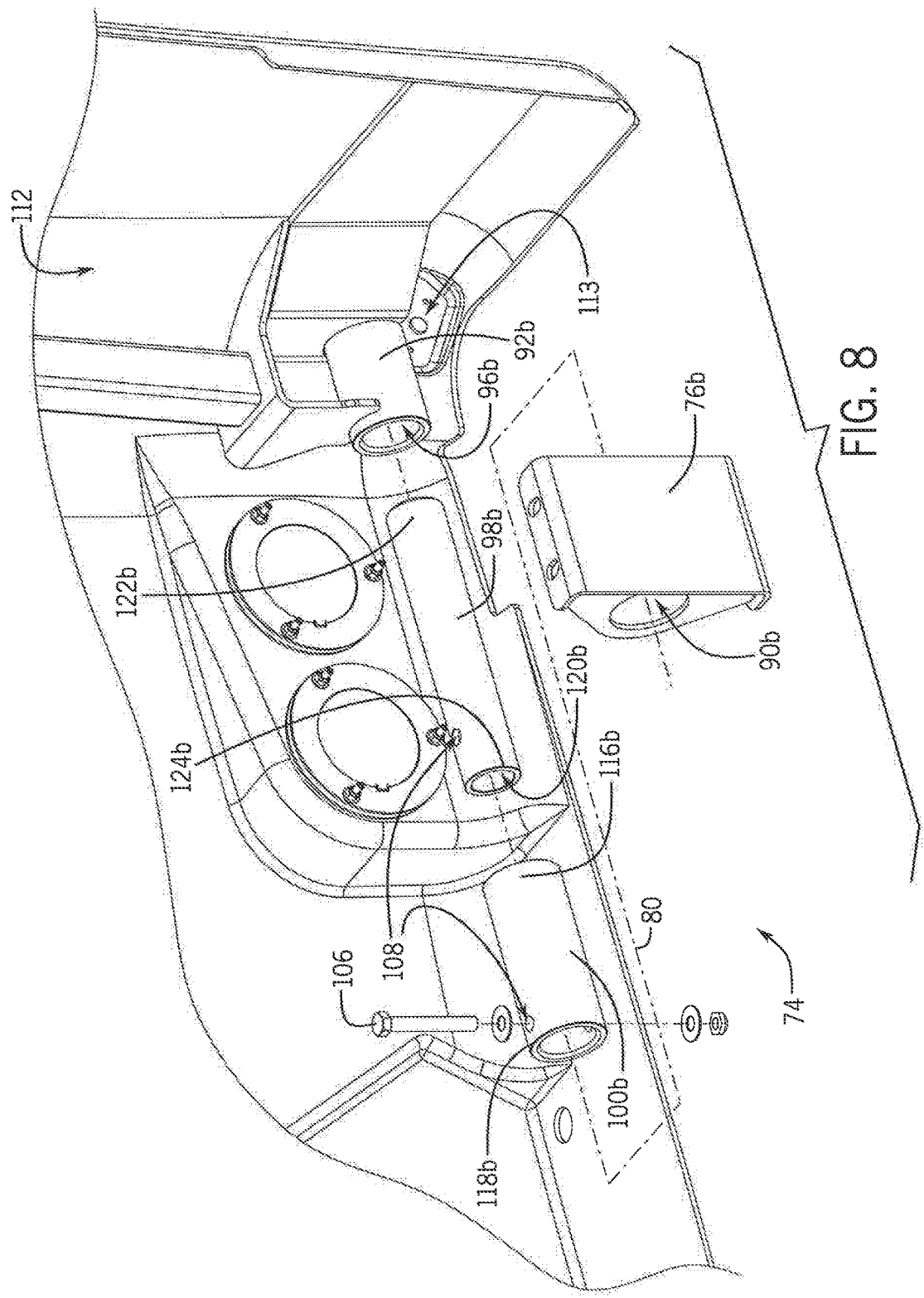
FIG. 8 is an exploded isometric view of a second portion of the engine hood mounting system of FIG. 6, according to an embodiment of the invention.

FIGS. 7 and 8 depict exploded isometric views of the pivot bar assemblies 88. In FIG. 7, the first pivot bar assembly 88a is shown located in a first bottom location 110 of the inner surface 94 of the engine hood 48, which is located at or adjacent to the first bottom corner 111 of the inner surface 94 of the engine hood. As previously described, the first pivot bar assembly 88a is configured to interfit with both the channel 96a formed in the first engine hood pivot mount 92a and the channel 90a formed in the first pivot support 76a. In FIG. 8, the second pivot bar assembly 88b is shown located at a second bottom location 112 of the inner surface 94 of the engine hood 48, which is located at or adjacent to the second bottom corner 113 of the inner surface 94 of the engine hood. Similar to the first pivot bar assembly 88a, the second pivot bar assembly 88b is configured to interfit with both the channel 96b formed in the second engine hood pivot mount 92b and the channel 90b formed in the second pivot support 76b.

In the representative embodiment of the invention, each outer pivot bar 100 includes a cavity 114 formed therein that extends from a first end 116 of the outer pivot bar 100 to a second end 118 of the outer pivot bar 100. The dimensions of the cavity 114 of the outer pivot bar 100 are such as to allow the respective inner pivot bar 98 to be inserted into the cavity 114 of outer pivot bar 100. In turn, each inner pivot bar 98 may or may not also include a cavity 120 formed therein and extending from a first end 122 to a second end 124 of the inner pivot bar 98.

Referring back to FIG. 6, the first end 122a of the first inner pivot bar 98a of the first pivot bar assembly 88a is inserted into the channel 96a of the first engine hood pivot support 92a. In the representative embodiment of the invention, the dimensions of the channel 96a of the first engine hood pivot support 92a are greater than or equal to the outer dimensions of the first inner pivot bar 98a. As such, when the first pivot bar assembly 88a is inserted into the channel 96a of the first engine hood pivot support 92a, it is the first inner pivot bar 98a that is placed within the channel 96a while the first outer pivot bar 98b remains outside the channel 96a. However, it is also contemplated that in other embodiments of the invention, the dimensions of the channel 96a may be such that both the first inner and outer pivot bars 98a, 100a of the first pivot bar assembly 88a may be disposed within the channel 96a of the first engine hood pivot support 92a. Further, the dimensions of the first pivot joint 76a are greater than or equal to the outer dimensions of the first outer pivot bar 100a so that both the first inner and outer pivot bars 98a, 100a of the first pivot bar assembly 88a may be disposed within the channel 90a of the first pivot joint 76a at a location between their respective first and second ends 116a, 118a, 122a, 124a.

Similar to the first pivot bar assembly 88a described above, the first end 122b of the second inner pivot bar 98b of the second pivot bar assembly 88b is inserted into the channel 96b of the second engine hood pivot support 92b. In the representative embodiment of the invention, the dimensions of the channel 96b of the second engine hood pivot support 92a are greater than or equal to the outer dimensions of the second inner pivot bar 98b so that it is the second inner pivot bar 98b that is placed within the channel 96b when the second pivot bar assembly 88b is inserted into the channel 96b of the second engine hood pivot support 92b. However, in other embodiments of the invention, both the second inner and outer pivot bars 98b, 100b may be disposed within the channel 96b when the second pivot bar assembly 88b is inserted into the channel 96b of the second engine hood pivot support 92b. Meanwhile, the dimensions of the second pivot joint 76b are greater than or equal to the outer dimensions of the second outer pivot bar 100b in order to allow both the second inner and outer pivot bars 98b, 100b of the second pivot bar assembly 88b may be disposed within the channel 90b of the second pivot joint 76b at a location between their respective first and second ends 116b, 118b, 122b, 124b.

As previously stated, the engine hood pivot supports 92 are located in the bottom locations 110, 112 of the inner surface 94 of the engine hood 48. However, it is also contemplated that the engine hood pivot supports 92 may be located at any location along the lower portion of the inner surface 94 of the engine hood 48. By disposing the engine hood pivot supports 92 at locations along the lower portion of the inner surface 94 of the engine hood 48, the rotation axis is aligned with the lower portion of the inner surface 94 of the engine hood 48. As a result, when the engine hood 48 is transitioned from a closed position 70 to an open position 72, the engine hood 48 is rotated to allow easy access to the engine compartment 36 by a user without the engine hood 48 being disposed over the head of the user.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. An engine hood mounting system of an agricultural machine comprising:
   an engine hood having at least one engine hood pivot support disposed on an inner surface thereof;
   at least one pivot joint located on a chassis frame of the agricultural machine;
   at least one pivot bar assembly configured to interfit with a respective one of the at least one pivot joint and with a respective one of the at least one engine hood pivot support, the at least one pivot bar assembly comprising:
      an outer pivot bar having a first end and a second end;
      an inner pivot bar disposed within the outer pivot bar and having a first end and a second end; and
      a fastener extending through the outer and inner pivot bars so as to couple the outer and inner pivot bars to each other;
   and
   wherein each at least one pivot bar assembly, its respective one of the at least one engine hood pivot support, and its respective one of the at least one pivot joint are oriented along a rotation axis.

2. The engine hood mounting system of claim 1 wherein the first end of the inner pivot bar of each of the at least one pivot bar assembly is disposed within a channel of a respective one of the at least one engine hood pivot support; and
   wherein a portion of the outer and inner pivot bars are disposed within a channel of a respective one of the at least one pivot joint at a location between the first and second ends of the outer and inner pivot bars.

3. The engine hood mounting system of claim 1 wherein each of the at least one pivot joint is located on a rear surface of the chassis frame.

4. The engine hood mounting system of claim 1 wherein the at least one pivot joint includes a first pivot joint and a second pivot joint;
   the first pivot joint located on a rear surface of the chassis frame adjacent a first side edge of the chassis frame; and
   the second pivot joint located on the rear surface of the chassis frame adjacent a second side edge of the chassis frame.

5. The engine hood mounting system of claim 1 wherein each of the at least one engine hood pivot support is disposed at a respective location on a lower portion of the inner surface of the engine hood.

6. The engine hood mounting system of claim 1 wherein the at least one engine hood pivot support includes a first engine hood pivot support and a second engine hood pivot support;
   the first engine hood pivot support located at a first location at or adjacent the first bottom corner of the inner surface of the engine hood; and
   the second engine hood pivot support located at a second location at or adjacent the second bottom corner of the inner surface of the engine hood.

7. The engine hood mounting system of claim 1 wherein the engine hood is transitionable between a closed position and an open position along the rotation axis.

8. The engine hood mounting system of claim 1 wherein the engine hood includes a top portion, a rear-facing portion, a first side portion, and a second side portion.

9. A method of manufacturing an engine hood mounting system of an agricultural machine, the method comprising:

providing an engine hood having at least one pivot support disposed along a lower portion of an inner surface thereof;

providing a chassis frame having at least one pivot joint disposed on a rear surface thereof;

inserting at least one pivot bar assembly into a channel of a respective one of the at least one pivot support and into a channel of a respective one of the at least one pivot joint in order to rotatably couple the engine hood and the chassis frame, the at least one pivot bar assembly including:

an outer pivot bar having a first end and a second end; and an inner pivot bar disposed within the outer pivot bar and having a first end and a second end;

inserting a fastener through the outer and inner pivot bars so as to couple the outer an inner pivot bars to each other; and wherein each of the pivot support, pivot joint, and pivot bar assembly are oriented along a rotation axis.

10. The method of claim 8 wherein providing an engine hood having at least one pivot support disposed along a lower portion of an inner surface thereof comprises providing an engine hood having a first pivot support disposed at a first bottom location of the inner surface of the engine hood and a second pivot support disposed at a second bottom location of the inner surface of the engine hood.

11. The method of claim 8 wherein providing a chassis frame having at least one pivot joint disposed on a rear surface thereof comprises providing a chassis frame having a first pivot joint disposed adjacent a first edge of the chassis frame and a second pivot joint disposed adjacent a second edge of the chassis frame.

12. The method of claim 8 wherein inserting at least one pivot bar assembly into a channel of a respective one of the at least one pivot support and into a channel of a respective one of the at least one pivot joint in order to rotatably couple the engine hood and the chassis frame comprises:

inserting a first pivot bar assembly into the channel of the first pivot support and into the channel of the first pivot joint; and inserting a second pivot bar assembly into the channel of the second pivot support and into the channel of the second pivot joint.

13. The method of claim 8 wherein the step of inserting at least one pivot bar assembly into a channel of a respective one of the at least one pivot support and into a channel of a respective one of the at least one pivot joint comprises:

disposing a first end of the inner pivot bar within the channel of a respective one of the at least one engine hood pivot support; and disposing a portion of the outer and inner pivot bars within the channel of a respective one of the at least one pivot joint at a location between the first and second ends of the outer and inner pivot bars.

14. An engine hood mounting system of an agricultural machine comprising:

a first pivot support located at a first bottom location of an inner surface of an engine hood;

a second pivot support located at a second bottom location of the inner surface of the engine hood;

a first pivot joint coupled to a chassis frame adjacent a first edge of a chassis frame;

a second pivot joint coupled to the chassis frame adjacent a second edge of the chassis frame, the first edge being opposite the second edge;

a first pivot bar assembly having a first end disposed within the first pivot support and a portion between the first end and a second end disposed within the first pivot joint, the first pivot bar assembly including;

an outer pivot bar having a first end and a second end;

an inner pivot bar disposed within the outer pivot bar and having a first end and a second end; and a fastener extending through the outer and inner pivot bars so as to couple the outer and inner pivot bars to each other;

a second pivot bar assembly having a first end disposed within the second pivot support and a portion between the first end and a second end disposed within the second pivot joint, the second pivot bar assembly including:

an outer pivot bar having a first end and a second end;

an inner pivot bar disposed within the outer pivot bar and having a first end and a second end; and a fastener extending through the outer and inner pivot bars of the second pivot bar assembly so as to couple the outer and inner pivot bars of the second pivot bar assembly to each other;

wherein the first and second pivot bar assemblies, the first and second pivot joints, and the first and second pivot supports are centered on an axis.

15. The engine hood mounting system of claim 14 wherein the first pivot bar assembly is configured to rotate within the first pivot joint;

wherein the second pivot bar assembly is configured to rotate within the second pivot joint; and wherein the first and second pivot bar assemblies rotate around the axis.

16. The engine hood mounting system of claim 15 wherein a first end of the first inner pivot bar is disposed within the first pivot support;

wherein a portion of the outer and inner pivot bars of the first pivot bar assembly between the first and second ends of the outer and inner pivot bars of the first pivot bar assembly is disposed within the first pivot joint;

wherein a first end of the inner pivot bar of the second pivot bar assembly is disposed within the second pivot support; and wherein a portion of the outer and inner pivot bars of the second pivot bar assembly between the first and second ends of the second outer and inner pivot bars of the second pivot bar assembly is disposed within the second pivot joint.

17. The engine hood mounting system of claim 14 wherein the first and second pivot joints are coupled to a rear surface of the chassis frame.

18. The engine hood mounting system of claim 14 wherein the first bottom location is at or adjacent to a first bottom corner of the inner surface of the engine hood; and wherein the second bottom location is at or adjacent to a second bottom corner of the inner surface of the engine hood.

19. The engine hood mounting system of claim 14 wherein the engine hood is transitionable between a closed position and an open position along the axis.

* * * * *